(12) United States Patent
Shen (10) Patent No.: US 10,341,703 B1
(45) Date of Patent: Jul. 2, 2019

(54) INTEGRATED AUDIENCE INTERACTION MEASUREMENTS FOR VIDEOS

(71) Applicant: Hitachi, Ltd., Chiyoda-ku, Tokyo (JP)

(72) Inventor: Qifeng Shen, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/019,344

(22) Filed: Jun. 26, 2018

(51) Int. Cl.
| | |
|---|---|
| H04N 21/25 | (2011.01) |
| H04N 21/262 | (2011.01) |
| H04N 21/24 | (2011.01) |
| G06Q 30/02 | (2012.01) |
| H04N 21/258 | (2011.01) |
| H04L 29/08 | (2006.01) |
| G06Q 30/00 | (2012.01) |
| G06Q 50/00 | (2012.01) |

(52) U.S. Cl.
CPC ....... *H04N 21/26241* (2013.01); *G06Q 30/01* (2013.01); *G06Q 30/0251* (2013.01); *G06Q 50/01* (2013.01); *H04L 29/08954* (2013.01); *H04N 21/2402* (2013.01); *H04N 21/2407* (2013.01); *H04N 21/25841* (2013.01)

(58) Field of Classification Search
None
See application file for complete search history.

(56) References Cited

U.S. PATENT DOCUMENTS

| | | | |
|---|---|---|---|
| 8,286,206 B1* | 10/2012 | Aaron | H04N 21/252 725/46 |
| 9,612,995 B2 | 4/2017 | Lopatecki et al. | |
| 2009/0133058 A1 | 5/2009 | Kouritzin et al. | |
| 2011/0225608 A1* | 9/2011 | Lopatecki | G06F 15/16 725/34 |
| 2014/0081991 A1* | 3/2014 | Aaron | H04H 60/33 707/749 |

OTHER PUBLICATIONS

Bao Viet Nguyen, Netflix ISP Speed Index for Jun. 2017, p. 1-6 (Year: 2017).*
"Nielsen Total Audience" http://www.nielsen.com/us/en/solutions/capabilities/total-audience.html; retrieved Jun. 26, 2018, 7 pages.
"Google Video Quality Report" https://www.google.com/get/videoqualityreport/; retrieved Jun. 26, 2018, 1 page.
"Netflix ISP Speed Index" https://ispspeedindex.netflix.com/country/us/; retrieved Jun. 26, 2018, 2 pages.

* cited by examiner

*Primary Examiner* — Cai Y Chen
(74) *Attorney, Agent, or Firm* — Procopio, Cory, Hargreaves & Savitch LLP (57) ABSTRACT

Example implementations described herein involve determining, for a video program, viewing patterns of a plurality of viewers of the video program; for a threshold of the plurality of viewers having changing viewing patterns for the video program during broadcast of the video program, determining if the threshold of the plurality of viewers having the changing viewing patterns are only associated with a local station broadcasting to a local geographical region; for the threshold of the plurality of viewers having the changing viewing patterns being only associated with a local geographical region, transmitting, to a station managing the local geographical region, instructions regarding at least one of video program outage and bit rate throughput issue for the video program.

18 Claims, 11 Drawing Sheets

| 801 | 802 | 803 |
|---|---|---|
| Individual (semi-static) | Individual (dynamic) | Aggregated Patterns |
| Profile<br>• Age<br>• Location<br>• Gender<br>• Education<br>• Interests<br>• Device(s)<br>• Job(s)<br>• Social circle | Viewing Profile<br>• Contents viewed<br>• For each content<br>  ○ Wall clock time<br>  ○ Duration<br>  ○ Playthrough rate<br>  ○ Device<br>  ○ Content provider<br>  ○ Service provider<br>  ○ Bite rates<br>Analytics<br>• Ranks<br>• Temporal trends<br>• Content preferences | Network Transport<br>• Inferred outage<br>• Inferred degradation<br>Content Provider<br>• Encoding/Decoding<br>• Bit rate adequacy<br>• Delivery network<br>Contents<br>• Ranking<br>• Trends<br>Demographics<br>• Age<br>• Locale |

INTEGRATED AUDIENCE INTERACTION MEASUREMENTS FOR VIDEOS

BACKGROUND

Field

The present disclosure is directed to video systems, and more specifically, to accurately determining viewer engagement, Quality of Experience (QoE) and service outages through a novel audience interaction measurement scheme.

Related Art

In related art implementations, there is a system and method for passively monitoring the user viewing behavior, and calculating user preferences for video clips based on video content type and user grouping. The probability of a user viewing a specific video clip is correlated with metadata such as demographic information. Such related art implementations involve a two-tiered setup of data collection on the client side as well as centralized processing.

In related art implementations, there are also methods and apparatuses to perform real-time audience estimation and commercial selection suitable for targeted advertising. Such related art implementations utilize click stream (e.g., in cable set top box activities) to estimate and filter signals to gain information on the adequacy of the program delivered to users. Such related art implementations can be used for ad placement. It focuses on linear TV, specifically on set top boxes. Even though some user behavior is factored in, the amount of data or actions are limited to click streams. User demographic information is considered, but the source of such information is static.

In related art implementations for television implementations, consumer research companies tend to utilize non-real-time and sampling based audience measurement data. In related art implementations for streamlining videos, audience measurement data is conducted with the focus on measurement and prediction of video quality by location. Such related art implementations do not have individualized metrics and do not function in real time. Other systems may focus on Internet Service Provider (ISP) QoE rankings.

SUMMARY

In the related art, there is no solution that bridges audience measurements for linear and streaming videos. Near real time audience information is available, but there are no systems that utilize any correlation to internal metrics or social metrics related to content. Further, micro segmentation is not utilized in the related art; data is aggregated rather than examined per user.

Further, related art implementations are more focused on post processing, even though the mid-roll data is being collected. In such related art implementations, real-time behavior (e.g., binge watching, channel surfing) is difficult to ascertain.

Example implementations described herein are directed to solutions that can be available to a user as a service and could be deployed on premise or in the cloud. Further, example implementations use relative scoring to deduce the probability of a transition occurring for a user or users from video A to video B. Example implementations utilize additional data sources, such as social media feeds, to conduct correlations to more accurately determine user behavior and/or video outages.

Aspects of the present disclosure can include a method, which can involve determining, for a video program, viewing patterns of a plurality of viewers of the video program; for a threshold of the plurality of viewers having changing viewing patterns for the video program during broadcast of the video program, determining if the threshold of the plurality of viewers having the changing viewing patterns are only associated with a local station broadcasting to a local geographical region; for the threshold of the plurality of viewers having the changing viewing patterns being only associated with a local geographical region, transmitting, to a station managing the local geographical region, instructions regarding at least one of video program outage and bit rate throughput issue for the video program.

Aspects of the present disclosure further include a non-transitory computer readable medium, storing instructions for executing a process by one or more processors, the instructions involving determining, for a video program, viewing patterns of a plurality of viewers of the video program; for a threshold of the plurality of viewers having changing viewing patterns for the video program during broadcast of the video program, determining if the threshold of the plurality of viewers having the changing viewing patterns are only associated with a local station broadcasting to a local geographical region; for the threshold of the plurality of viewers having the changing viewing patterns being only associated with a local geographical region, transmitting, to a station managing the local geographical region, instructions regarding at least one of video program outage and bit rate throughput issue for the video program.

Aspects of the present disclosure include an apparatus, involving a processor, configured to determine, for a video program, viewing patterns of a plurality of viewers of the video program; for a threshold of the plurality of viewers having changing viewing patterns for the video program during broadcast of the video program, determine if the threshold of the plurality of viewers having the changing viewing patterns are only associated with a local station broadcasting to a local geographical region; for the threshold of the plurality of viewers having the changing viewing patterns being only associated with a local geographical region, transmit, to a station managing the local geographical region, instructions regarding at least one of video program outage and bit rate throughput issue for the video program.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations are directed to the facilitation of functionalities such as the integration of real-time and historical audience interaction via streaming, linear video programming, and social media. Other functionalities described herein include tracking behavior across devices and channels, personalization and targeted measurement, identification of valuable clusters/segments of customers, identification of patterns of content engagement and commercial campaign responses, and identification of video outages.

Figure 1:
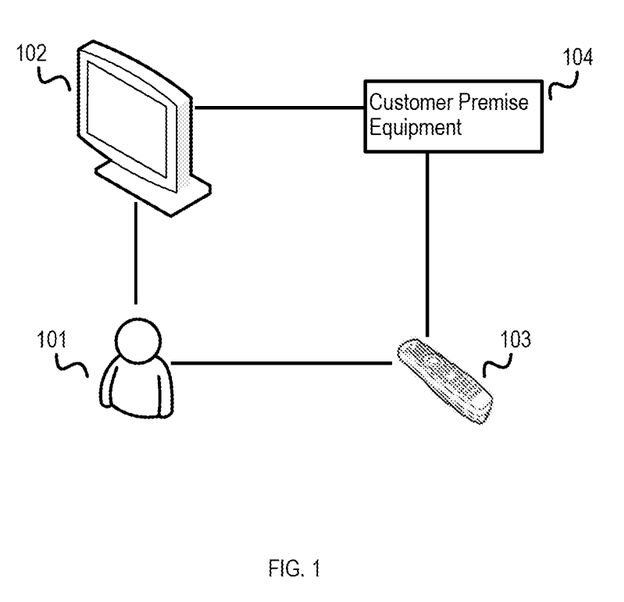
FIG. 1 illustrates a viewing environment, in accordance with an example implementation.

FIG. 1 illustrates a viewing environment, in accordance with an example implementation. In the example environment of FIG. 1, user 101 uses a control device 103 to change what is displayed on the screen 102, by sending signals to and through the customer premise equipment (CPE). It should be noted that entities 102 and 103 are logical representations of the display and control unit. Such units can also be physically separate, as is the case in a system with a TV set and a remote controller. Or they could be on the same physical device, such as a laptop computer or a smart phone. In example implementations, the CPE 104 does not have to reside inside a customer premise physically. Depending on the desired implementation, the CPE 104 can also reside in the provider's office or in the cloud. The CPE 104 is a hardware/software system involving one or more software entities. Furthermore, the software can be updated and upgraded according to the desired implementation. In example implementations, CPE 104 can also be implemented virtually, with each CPE 104 configured to serve one person or one household.

Figure 2:
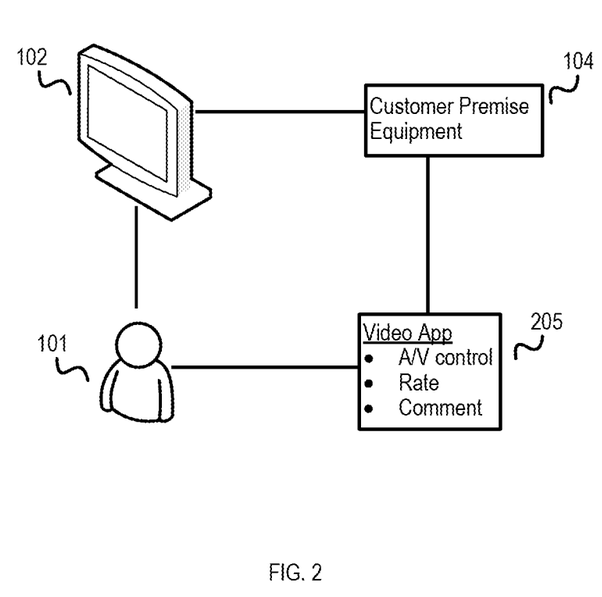
FIG. 2 illustrates a viewing environment involving a video application, in accordance with an example implementation.

FIG. 2 illustrates a viewing environment involving a video application, in accordance with an example implementation. In the viewing environment of FIG. 2, control device 103 is replaced by a video application 205. In addition to the functions of control device 103, a user 101 can use the application 205 to rate the video quality (e.g., from a scale 1 to 5), similar to a mean opinion score (MOS) measurement for voice communication. Such example implementations can thereby obtain a direct measurement of the quality of experience by the end user while taking other factors into account such as network transport, video encoding and decoding, bit rate, Content Delivery Network (CDN) caching, and so on. A user 101 can also use the application 205 to rate the video content quality to reflect the user preference to the video content. Such implementations result in a direct feedback to the content provider. The "comment" function could be used to report any kind of service degradation or outage, according to the desired implementation.

Figure 3:
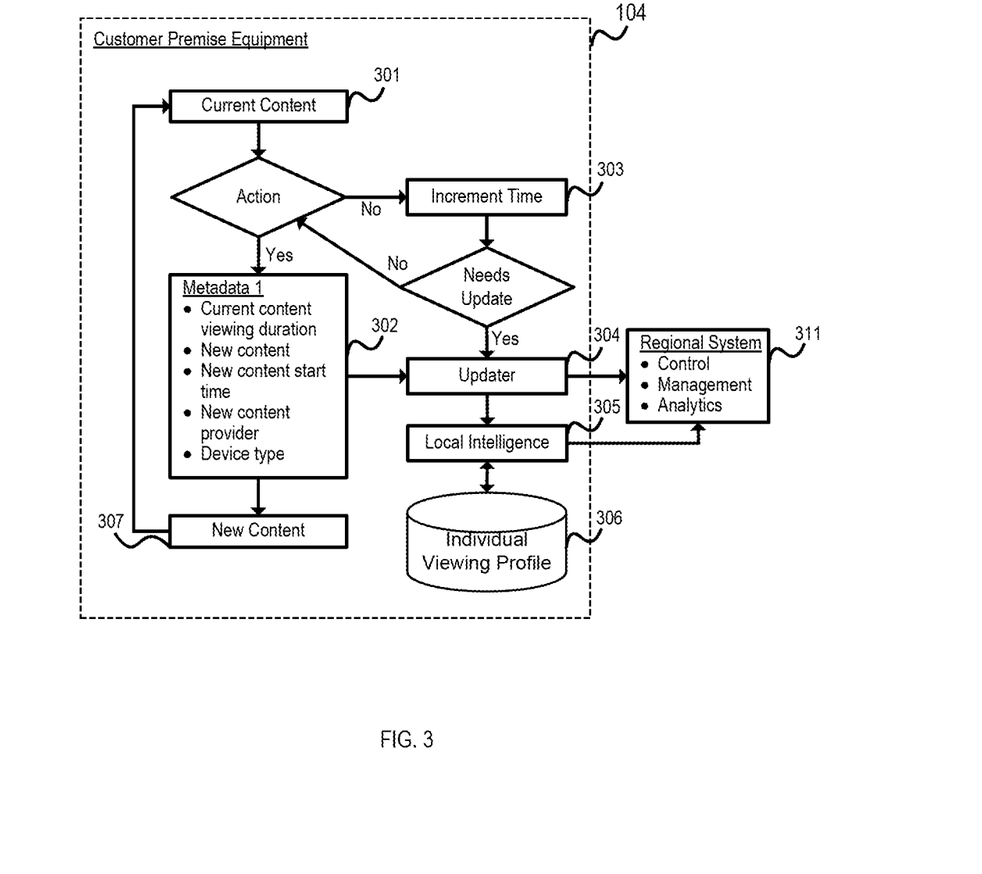
FIG. 3 illustrates CPE functions in accordance with an example implementation.

FIG. 3 illustrates CPE functions in accordance with an example implementation. In an example implementation, some of the CPE functions involve using a content change event (e.g., "Action" is changing channel). In this context, the content can mean a TV channel, a TV program, or an over-the-top (OTT) stream. A user 101 is watching content 301, then uses the remote 103 or an application 205 to switch to another content 307. This action will trigger a sequence of events inside the CPE. First, the metadata about the viewing the current content will be calculated and gathered inside "Metadata 1" 302. Within the same block, the information about the new content will be captured. The information is sent to the "Updater" 304 for processing to determine what information is sent to the "Local Intelligence" 305 and what information is sent to the "Regional System" 311 for aggregation and for region-wide analytics.

The "Local Intelligence" 305 uses information from the "Updater" 304 and the historical data from the "Individual Viewing Profile" 306 datastore to detect the user's viewing behavior in near real time. Further details of such implementations are described with respect to FIGS. 4A to 4D.

Figure 4A:
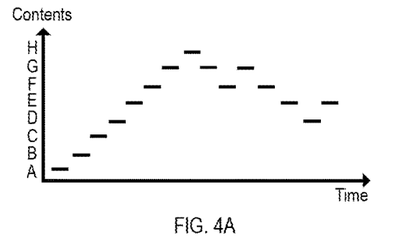
FIGS. 4A to 4D illustrate examples of individual viewing profiles, in accordance with an example implementation.

If the user stays on each content for a short period time and switches content frequently, as shown in FIG. 4A, it is deemed that user is channel surfing. The duration to stay on one content, the frequency of content changes, and the number of contents viewed within a time period are examples of the attributes factored into the decision making. Such attributes can be configured and/or learned through machine-learning, depending on the desired implementation.

Figure 4B:
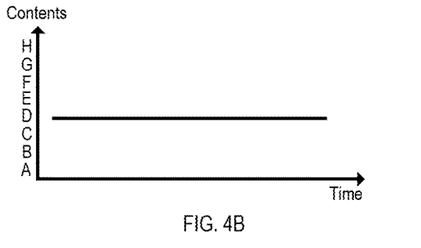

Long periods of time as shown in FIG. 4B, (e.g., greater than two hours) on the same content can be an indication of binge watching. Depending on the desired implementation, the decision can be further based on the daily watching behavior of the user to determine if the behavior is binge watching (e.g. if the user spends many off-hour times each day on the same channel or stream then it may not be binge watching).

Figure 4C:
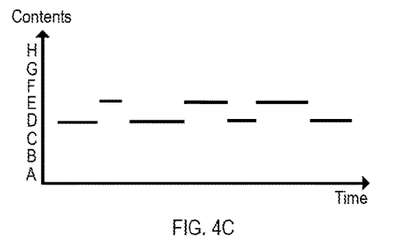

A user can also be toggling between two channels as shown in FIG. 4C. Depending on the amount of time the user stays on each channel, example implementations can be configured to deduce which channel is the most preferred and which is the second most preferred in that time duration. By combining such information from "Content Asset Metadata" 513 in FIG. 5B, example implementations can detect if the user is skipping advertisements in one or both channels.

Figure 4D:
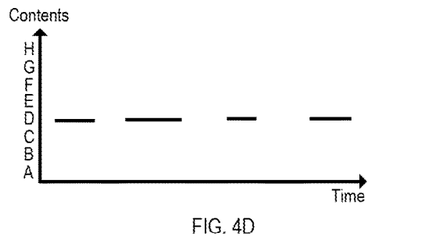

Likewise, if the "Action" is skipping or fast forward while the user stays on the same channel as shown in FIG. 4D, it implies that the users is less interested in certain portion of the content, such as the advertisements.

If there is no "Action" while the user stays on a channel, the viewing information is still updated periodically when the timer in the "Increment Time" 303 block crosses a time threshold.

The individual viewing history, metadata, and local analysis results are stored in the CPE datastore 206. Portion of the local intelligence is also sent to the regional system 301 for further processing.

Figure 5A:
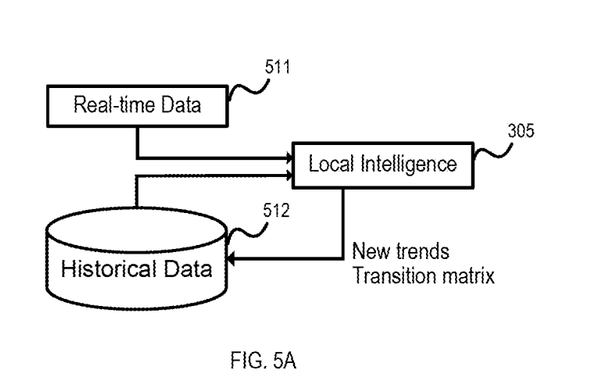
FIGS. 5A and 5B illustrate example flows for utilizing historical data and real-time data, in accordance with an example implementation.
Figure 5B:
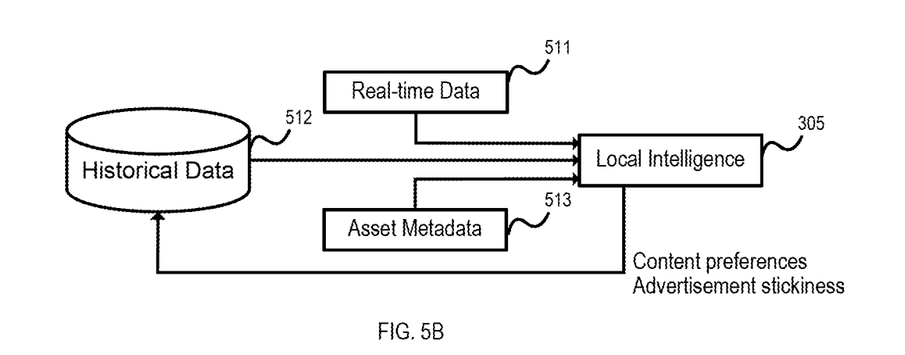

FIG. 5A illustrates an example flow for detecting new trends for a user through combining the real-time data 511 and the historical data 512, in accordance with an example implementation. Through the execution of the flow of FIG. 5A, the transition matrix depicted in FIG. 6 can also be calculated. By factoring the content asset metadata 513, the preference to the content and stickiness of advertisement within the stream can be also extracted in accordance with the desired implementation, as shown in FIG. 5B.

Figure 6:
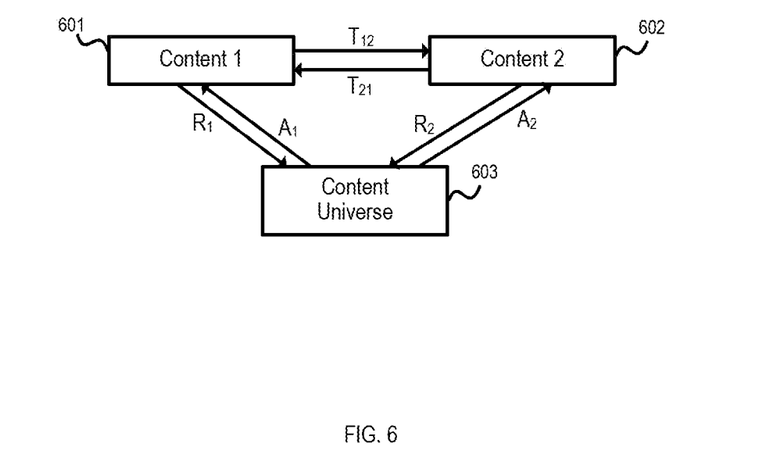
FIG. 6 shows the transition matrix in accordance with an example implementation.

FIG. 6 shows the transition matrix T between "Content 1" 601 and "Content 2" 602, in accordance with an example implementation. Additionally, the attractiveness index A and the repulsiveness index R show the favorability/preference or un-favorability of a specific content among all the available content in the content universe 603. These are all probabilities based on individual viewing behavior correlated with group behaviors.

Figure 7:
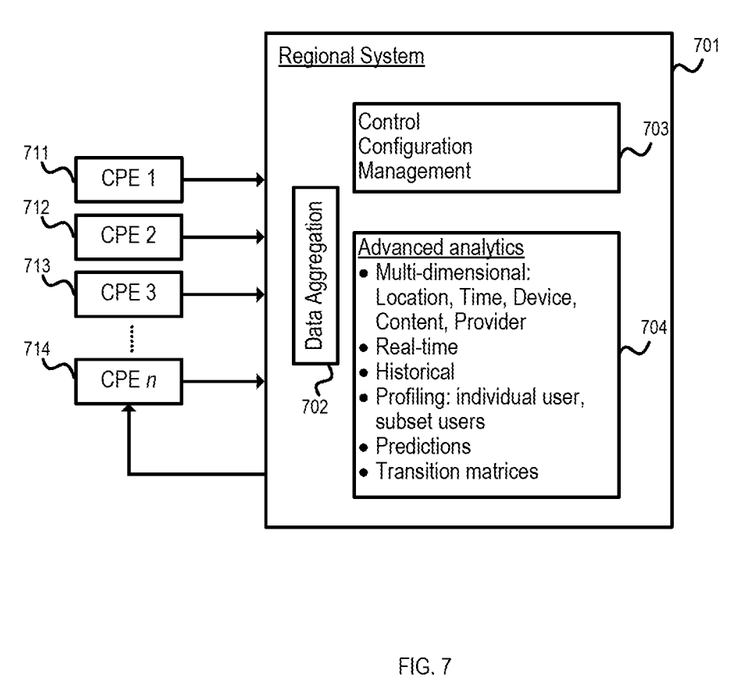
FIG. 7 is an illustration of a regional system, in accordance with an example implementation.

FIG. 7 is an illustration of a regional system 701 (the same entity as 301 in FIG. 3) that takes inputs from multiple CPEs 711, 712, 713, 714, aggregates the data 702, and performs various advanced analytics 704 to get group patterns and trends. The analysis and analytical results are mostly multi-dimensional correlations among various attributes, like location, time, user age, and so on. These results can be sent to a system dashboard for real-time visualization, in accordance with a desired implementation. The trend analysis and predictions are also fed back to the CPEs to give end users hints or let them know which contents are available that they might like, based on their individual preferences and on the preferences of the "like-minded" users. When service degradation occurs, the system could inform the user if it is occurring to that user only or to others in the vicinity as well.

Figure 8:
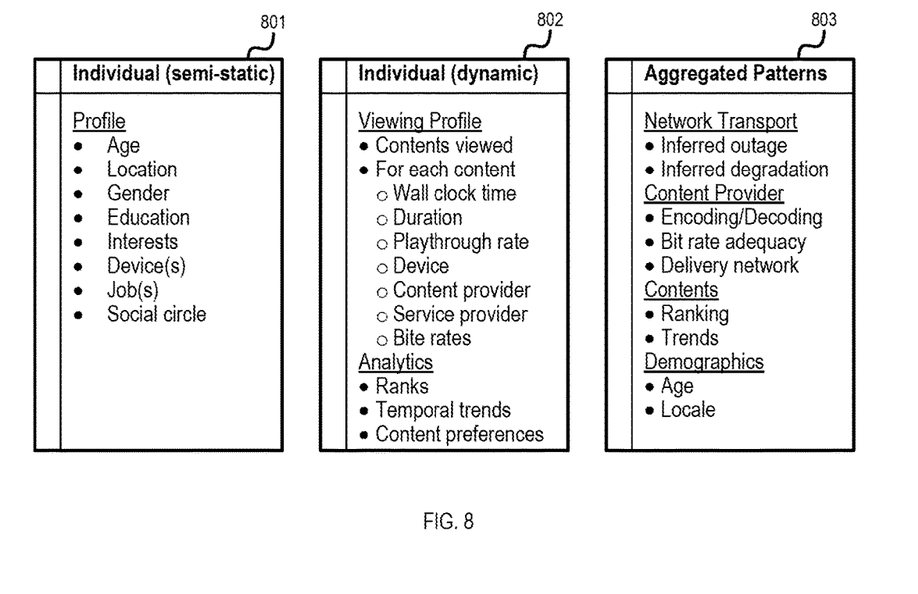
FIG. 8 illustrates examples of the data stored in the regional system, in accordance with an example implementation.

FIG. 8 illustrates examples of the data stored in the regional system, in accordance with an example implementation. Some of these data comes from configuration through the management component 703. Others are results of aggregation and analysis. There are as many copies of individual records 801 and 802 as there are the number users/households. The semi-static data 801 can reside on both the CPE and the regional system, depending on the desired implementation. The dynamic data 802 can be in the regional system, in accordance with the desired implementation. Depending on the desired implementation, some of the dynamic data 802 can be fed back to the CPE to aid the Local Intelligence 305 through the feedback line as illustrated in FIG. 7. The aggregated patterns 803 pertaining to group behavior are stored in the regional system. They are results of advanced analytics and serve as the inputs to the next iteration of the analytics.

Figure 9:
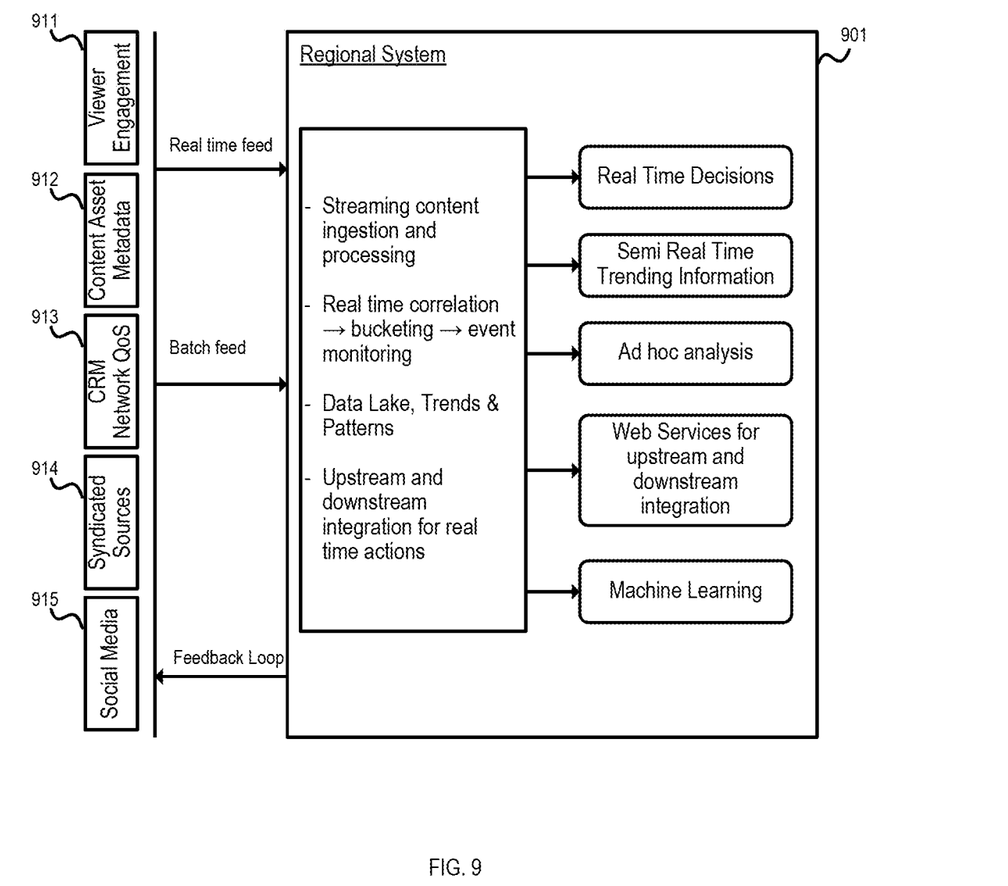
FIG. 9 illustrates examples of multiple data sources sending data to the system, in accordance with an example implementation.

FIG. 9 illustrates examples of multiple data sources sending data to the system, in accordance with an example implementation. In addition to the viewer engagement data 911 from CPEs, the data sources can include sources such as
   Content asset metadata 912 which includes the content bit rate, length, start time, commercial insertion points, titles, languages, and the provider.
   Customer Relationship Management (CRM) and Network Quality of Service (QoS) 913, which includes customer information, event logging, complaints, outages, and network performance information.
   Syndicated sources 914, which includes weather, power outages, and audience sampling.
   Social media 915 which includes social media posts, blogs, comments, and so on.

Some information, such as the content asset metadata 912, can be used to uniquely identify a particular event and its timing, providing visibility to contents. Others, such as social media 915, are inputs for gaining trending information and to corroborate and to enhance the accuracy of the trending and prediction of the system 901.

Figure 10:
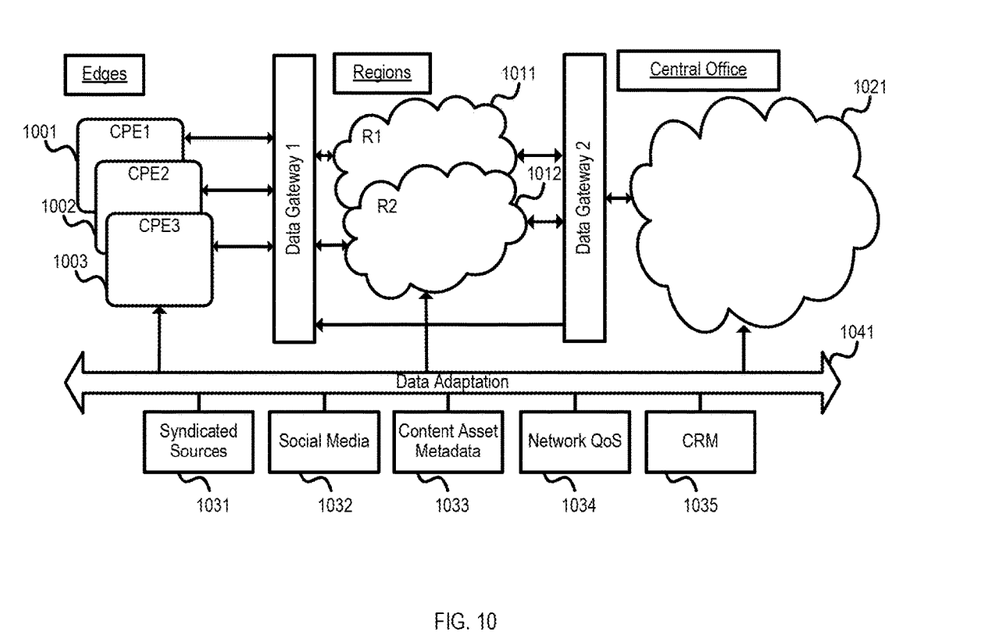
FIG. 10 illustrates the overall system with a multi-tiered sample architecture, in accordance with an example implementation.

FIG. 10 illustrates the overall system with a multi-tiered sample architecture, which includes the diverse nature of data inputs from sources 1031, 1032, 1033, 1034, and 1035. However, other data sources may be utilized, and the present disclosure is not limited thereto. Such inputs are optionally translated and transformed through adaptation layer 1041. The entities above the adaptation layer can select suitable data to ingest.

The CPEs 1001, 1002, and 1003 are the edge devices. There may also be multiple regional systems 1011 and 1012. The regional systems 1011 and 1012 are systems for a local geographical area that are managed by a local station. The information from each region is aggregated to a larger system "Central Office" 1021. Analytics are extracted at each tier with varying sophistication and facilitate a feedback loop as illustrated in FIG. 9 and FIG. 10. The feedback can be real-time and actionable instructions, which can speed up the system reaction and helps to improve user QoE. In other example implementations, the instructions can be executed automatically in cases of outages or bit rate problems.

In an example flow involving the architecture illustrated in FIG. 10, the central office 1021 determines, for a given video program, viewing patterns of a plurality of users of the video program based on data received through data adaptation layer 1041 and comparing the viewing patterns to examples of known behavior as illustrated in FIGS. 4A to 4D.

Suppose a threshold of viewers (e.g., as set according to the desired implementation) have changing viewing patterns for the video during broadcast of the video program that is different from the expected viewing patterns of the video broadcast. Such changes in viewing patterns can indicate a problem with the broadcast itself or unpopularity with the particular video program for that time. Thus, detection should be conducted to determine if adjustments to the broadcast needs to be done.

Accordingly, for the threshold viewers having changing viewing patterns for the video program during broadcast of the video program, the central office 1021 can be configured to determine if the threshold of the plurality of viewers having the changing viewing patterns are only associated with a local station broadcasting to a local geographical region through comparison of the users changing their viewing patterns with the managed geographical regions 1011, 1012. If the viewers having the changing viewing patterns are only associated with a particular local geographical region, then it is likely that there can be an issue regarding an outage for the video program and/or a bit rate throughput issue for the video program. As such, the central office 1021 transmits, to the corresponding station managing the local geographical region, instructions regarding a possible outage or bit rate throughput issue. In response, the station at the local region can automatically determine fault in the video broadcast and either alert the managers of the station, increase bandwidth allotment for the video program to address bit rate throughput, and/or change the broadcast the video program to be from an alternate server or source transmission depending on the desired implementation.

Such example implementations can be further granulized to determine specific issues based on the type of viewing pattern detected. For example, suppose the viewing patterns of the viewers for a local geographical region is detected to be channel surfing. Such a viewing pattern would indicate that network deterioration has occurred at the local geographical region, and that none of the channels are presently working. In such a circumstance, the central office 1021 can transmit to the corresponding local station, instructions indicating the network deterioration which can be executed automatically by the local station to either change the source of the programming or execute other protocols in accordance with the desired implementation.

In another example implementation, suppose the viewing patterns for the viewers at a local geographical region are indicative of avoiding a certain set of channels. Such a viewing pattern would indicate a bit rate throughput issue for those channels. Thus, the central office 1021 can transmit to the corresponding local station instructions indicative of a bit rate throughput issue for specific channels, In response, the station at the local region can increase bandwidth allotment for the specified channels or conduct other protocols in accordance with the desired implementation.

In example implementations, if the changing of the viewing pattern is not local, then it is likely that the video broadcast itself is not popular at that point in time, either due to advertisements or otherwise. Thus, if the central office 1021 determines that the threshold of the plurality of viewers changing their viewing pattern are not only associated with the local station broadcasting to the local geographical region, the central office 1021 will rank the quality of the video program based on information received from at least one of social media information, content asset metadata, syndicated sources, network Quality of Service (QoS), and Customer Relationship Management (CRM) information as illustrated in FIG. 9 and FIG. 10. In an example implementation, the central office 1021 will parse through social media posts to detect trends on social media (e.g., positive, negative), and keywords to determine the popularity of the program in accordance with the desired implementation. In another example implementation, the content asset metadata can be parsed by the central office 1021 to determine if particular commercial insertion points or the content bit rate are having an effect on viewership in accordance with the desired implementation. In another example implementation, CRM information can be utilized to determine complaints or demographic information based on customer information for determining the popularity of the program. In another example implementation, QoS can also be utilized to determine if the program is adversely affected by network performance in general. In another example implementation, the popularity can also be normalized based on audience sampling information provided through syndicated sources.

The ranking can be conducted based on the information obtained from social media, and the viewing patterns of users (e.g., ranking the program to be inverse to the number of viewers having viewing patterns indicating that they are not engaged with the program).

If no such threshold of changing patterns is detected, the central office 1021 can resume normal operations for determining a trend ranking of the program based on social media information, and setting an advertisement rate based on the trend ranking program. The rate can be set based on detected engagement and the viewing patterns of the viewers in accordance with the desired implementation.

Thus, through such example implementations, the central office 1021 can more accurately determine when broadcast outages occur and/or determine if such outages or throughput issues are localized to a particular region. Such implementations allow the central office 1021 to transmit executable instructions immediately to the local station managing the affected geographical region, thereby quickly finding the affected areas of the outage and repairing the video broadcast.

Example implementations can be utilized by content producers who, through audience interaction measurements and subsequent analytics, can thereby determine the popularities of the contents, the demographic distributions of the viewership, and the likelihood a user would be attracted to the contents. The information could help the content producer to make appropriate adjustments to the content and to distribute the content to high value groups of viewers.

Example implementations can also be utilized by content distributors that distribute content through multiple outlets. For example, a movie could be available through subscription TV, streaming video, and on internet channels. Due to differences in encoding, decoding, and compression, and in delivery networks, the user experiences could very well be different when the same content is viewed through different outlets. The direct end-to-end QoE measurement by the system makes this differentiation possible.

Example implementations can also be utilized for advertisements. With the measurement of the stickiness of the commercials and user's preference to the main contents, the advertisement agent could dynamically change and insert more effective commercials to maximize the effectiveness of the commercials.

Example implementations can also be utilized by the service provider. With QoE measurements and location information, the service provider could gain insight into whether the degradation in QoE is related to its network.

Figure 11:
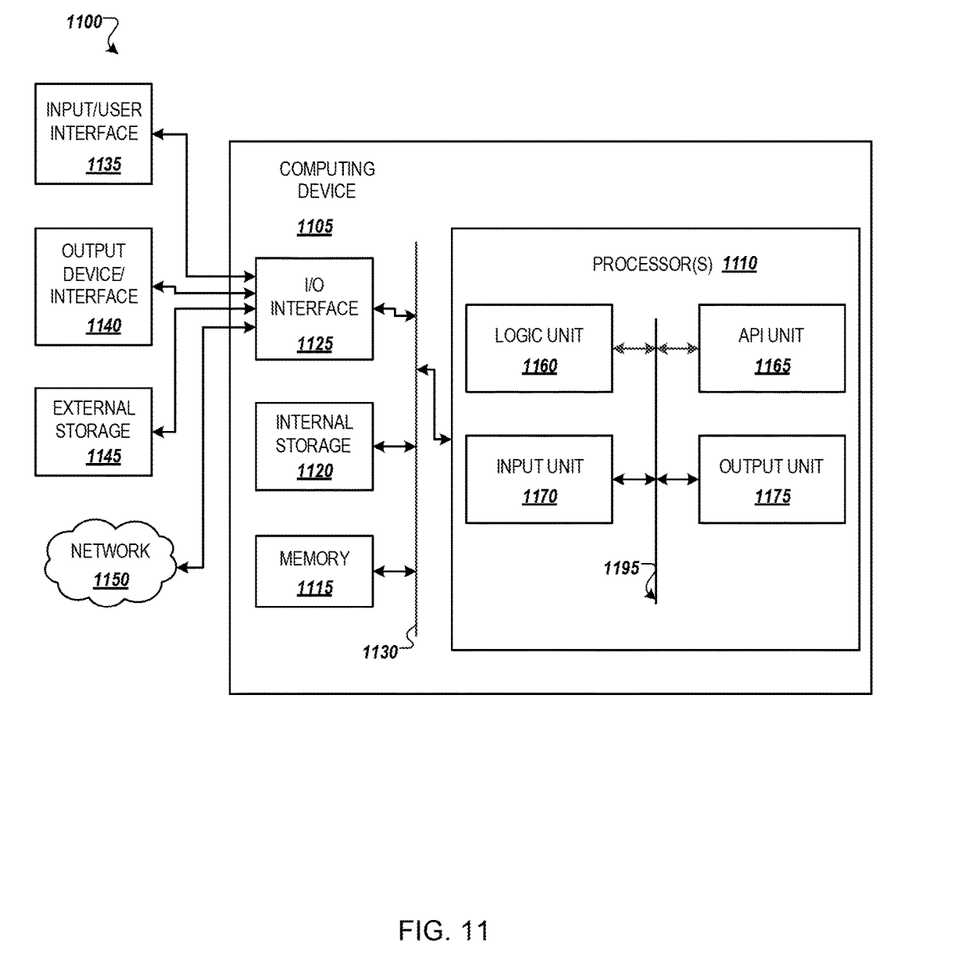
FIG. 11 illustrates an example computing environment with an example computer device suitable for use in some example implementations.

FIG. 11 illustrates an example computing environment with an example computer device suitable for use in some example implementations. Example implementations as described herein can be used as the platform for CPEs, regional offices or the central office as described in FIG. 10, and be configured to execute the processes as illustrated in FIGS. 3, 5A to 5B, 6, and 10, and the example implementations as described herein.

Computer device 1105 in computing environment 1100 can include one or more processing units, cores, or processors 1110, memory 1115 (e.g., RAM, ROM, and/or the like), internal storage 1120 (e.g., magnetic, optical, solid state storage, and/or organic), and/or I/O interface 1125, any of which can be coupled on a communication mechanism or bus 1130 for communicating information or embedded in the computer device 1105. I/O interface 1125 is also configured to receive images from cameras or provide images to projectors or displays, depending on the desired implementation.

Computer device 1105 can be communicatively coupled to input/user interface 1135 and output device/interface 1140. Either one or both of input/user interface 1135 and output device/interface 1140 can be a wired or wireless interface and can be detachable. Input/user interface 1135 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1140 may include a display, television, monitor, printer, speaker, braille, or the like. In some example implementations, input/user interface 1135 and output device/interface 1140 can be embedded with or physically coupled to the computer device 1105. In other example implementations, other computer devices may function as or provide the functions of input/user interface 1135 and output device/interface 1140 for a computer device 1105.

Examples of computer device 1105 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1105 can be communicatively coupled (e.g., via I/O interface 1125) to external storage 1145 and network 1150 for communicating with any number of networked components, devices, and systems, including one or more computer devices of the same or different configuration. Computer device 1105 or any connected computer device can be functioning as, providing services of, or referred to as a server, client, thin server, general machine, special-purpose machine, or another label.

I/O interface 1125 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1100. Network 1150 can be any network or combination of networks (e.g., the Internet, local area network, wide area network, a telephonic network, a cellular network, satellite network, and the like).

Computer device 1105 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1105 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1110 can execute under any operating system (OS) (not shown), in a native or virtual environment. One or more applications can be deployed that include logic unit 1160, application programming interface (API) unit 1165, input unit 1170, output unit 1175, and inter-unit communication mechanism 1195 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1165, it may be communicated to one or more other units (e.g., logic unit 1160, input unit 1170, output unit 1175). In some instances, logic unit 1160 may be configured to control the information flow among the units and direct the services provided by API unit 1165, input unit 1170, output unit 1175, in some example implementations described above. For example, the flow of one or more processes or implementations may be controlled by logic unit 1160 alone or in conjunction with API unit 1165. The input unit 1170 may be configured to obtain input for the calculations described in the example implementations, and the output unit 1175 may be configured to provide output based on the calculations described in example implementations.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
    determining, for a video program, viewing patterns of a plurality of viewers of the video program;
    for a threshold of the plurality of viewers having changing viewing patterns for the video program during broadcast of the video program:
        determining if the threshold of the plurality of viewers having the changing viewing patterns are only associated with a local station broadcasting to a local geographical region;
        responsive to the threshold of the plurality of viewers having the changing viewing patterns being only associated with a local geographical region:
            transmitting, to a station managing the local geographical region,
    instructions regarding at least one of video program outage and bit rate throughput issue for the video program.

2. The method of claim 1, wherein for the threshold of the plurality of users not changing their viewing pattern for the video program during the broadcast of the video program, determining a trend ranking of the program from at least one of social media information, content asset metadata, syndicated sources, network Quality of Service (QoS), and Customer Relationship Management (CRM) information, and setting an advertisement rate based on the trend ranking program.

3. The method of claim 1, wherein for the determination that the threshold of the plurality of viewers changing their viewing pattern are not only associated with the local station broadcasting to the local geographical region, ranking a quality of the video program based on social media information.

4. The method of claim 1, further comprising ranking a quality of the video program based on social media information and the viewing patterns.

5. The method of claim 1, wherein for the viewing patterns being indicative of channel surfing for the local geographical region, transmitting, to the station, instructions indicative of network deterioration.

6. The method of claim 1, wherein for the viewing patterns being indicative of avoidance of a set of channels, transmitting, to the station, instructions indicative of a bit rate throughput issue.

7. A non-transitory computer readable medium, storing instructions for executing a process by one or more processors, the instructions comprising:
    determining, for a video program, viewing patterns of a plurality of viewers of the video program;
    for a threshold of the plurality of viewers having changing viewing patterns for the video program during broadcast of the video program:
        determining if the threshold of the plurality of viewers having the changing viewing patterns are only associated with a local station broadcasting to a local geographical region;
        responsive to the threshold of the plurality of viewers having the changing viewing patterns being only associated with a local geographical region;
            transmitting, to a station managing the local geographical region, instructions regarding at least one of video program outage and bit rate throughput issue for the video program.

8. The non-transitory computer readable medium of claim 7, the instructions further comprising, wherein for the threshold of the plurality of users not changing their viewing pattern for the video program during the broadcast of the video program, determining a trend ranking of the program based on at least one of social media information, content asset metadata, syndicated sources, network Quality of Service (QoS), and Customer Relationship Management (CRM) information, and setting an advertisement rate based on the trend ranking program.

9. The non-transitory computer readable medium of claim 7, the instructions further comprising, wherein for the determination that the threshold of the plurality of viewers changing their viewing pattern are not only associated with the local station broadcasting to the local geographical region, ranking a quality of the video program based on information received from social media.

10. The non-transitory computer readable medium of claim 7, the instructions further comprising, ranking a quality of the video program based on social media and the viewing patterns.

11. The non-transitory computer readable medium of claim 7, the instructions further comprising, wherein for the viewing patterns being indicative of channel surfing for the local geographical region, transmitting, to the station, instructions indicative of network deterioration.

12. The non-transitory computer readable medium of claim 7, the instructions further comprising, wherein for the viewing patterns being indicative of avoidance of a set of channels, transmitting, to the station, instructions indicative of a bit rate throughput issue.

13. An apparatus, comprising:
    a processor, configured to:
    determine, for a video program, viewing patterns of a plurality of viewers of the video program;
    for a threshold of the plurality of viewers having changing viewing patterns for the video program during broadcast of the video program:
        determine if the threshold of the plurality of viewers having the changing viewing patterns are only associated with a local station broadcasting to a local geographical region;

responsive to the threshold of the plurality of viewers having the changing viewing patterns being only associated with a local geographical region:
transmit, to a station managing the local geographical region, instructions regarding at least one of video program outage and bit rate throughput issue for the video program.

14. The apparatus of claim 13, wherein for the threshold of the plurality of users not changing their viewing pattern for the video program during the broadcast of the video program, the processor is configured to determine a trend ranking of the program based on at least one of social media information, content asset metadata, syndicated sources, network Quality of Service (QoS), and Customer Relationship Management (CRM) information, and setting an advertisement rate based on the trend ranking program.

15. The apparatus of claim 13, wherein for the determination that the threshold of the plurality of viewers changing their viewing pattern are not only associated with the local station broadcasting to the local geographical region, the processor is configured to rank a quality of the video program based on information received from social media.

16. The apparatus of claim 13, further comprising ranking a quality of the video program based on social media and the viewing patterns.

17. The apparatus of claim 13, wherein for the viewing patterns being indicative of channel surfing for the local geographical region, the processor is configured to transmit, to the station, instructions indicative of network deterioration.

18. The apparatus of claim 13, wherein for the viewing patterns being indicative of avoidance of a set of channels, the processor is configured to transmit, to the station, instructions indicative of a bit rate throughput issue.

* * * * *